United States Patent
Rosmeulen et al.

(10) Patent No.: US 11,012,628 B2
(45) Date of Patent: May 18, 2021

(54) DEVICE FOR TIME DELAY AND INTEGRATION IMAGING AND METHOD FOR CONTROLLING TIME AND INTEGRATION IMAGING

(71) Applicant: IMEC VZW, Leuven (BE)

(72) Inventors: Maarten Rosmeulen, Ghent (BE); Pierre Boulenc, Woluwe Saint Lambert (BE); Piet De Moor, Lubbeek (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 16/677,184

(22) Filed: Nov. 7, 2019

(65) Prior Publication Data
US 2020/0145586 A1 May 7, 2020

(30) Foreign Application Priority Data
Nov. 7, 2018 (EP) .................................... 18204817

(51) Int. Cl.
*H04N 5/225* (2006.01)
*H04N 5/232* (2006.01)
*H04N 5/235* (2006.01)

(52) U.S. Cl.
CPC ....... *H04N 5/23299* (2018.08); *H04N 5/2351* (2013.01)

(58) Field of Classification Search
CPC ..................... H01L 27/14856; H04N 3/1525; H04N 5/372; H04N 5/37206; H04N 5/3743
See application file for complete search history.

(56) References Cited

U.S. PATENT DOCUMENTS

2004/0170314 A1* 9/2004 Harris .................. H04N 1/0473
382/151
2011/0141330 A1* 6/2011 Vampola ................ H04N 5/357
348/295

(Continued)

FOREIGN PATENT DOCUMENTS

JP 2011-146924 A 7/2011
WO 2016/182622 A1 11/2016

OTHER PUBLICATIONS

European Search Report, European Patent Application No. 18204817.3, dated Jan. 7, 2019, 9 pages.

(Continued)

*Primary Examiner* — Twyler L Haskins
*Assistant Examiner* — Dwight Alex C Tejano
(74) *Attorney, Agent, or Firm* — McDonnell Boehnen Hulbert & Berghoff LLP (57) ABSTRACT

A device for time delay and integration imaging comprises: an array of pixels being arranged in rows and columns extending in a first and second direction, respectively. Pixels may accumulate generated charges in response to received electro-magnetic radiation along each column. The rows comprise at least one lateral charge shifting row to selectively shift accumulated charges in a column to an adjacent column and a controller configured to receive at least two angle correction input values. Each angle correction input value is based on a received intensity of electro-magnetic radiation on a measurement line, wherein the at least two angle correction input values are acquired by measurement lines extending in directions defining different angles in relation to the second direction, wherein the controller is configured to, based on the received at least two angle correction input values, control activation of the at least one lateral charge shifting row.

14 Claims, 5 Drawing Sheets

(56) References Cited

U.S. PATENT DOCUMENTS

2012/0162359 A1 6/2012 Kendrick et al.
2014/0333783 A1* 11/2014 LaFarelle ............. G01C 11/025
　　　　　　　　　　　　　　　　　348/208.1
2016/0331265 A1* 11/2016 Chambers .......... H04N 5/37206

OTHER PUBLICATIONS

Holland, Andrew D. et al., "CCDs for the Redial Velocity Spectrometer on GAIA", Detectors and Associated Signal Processing. vol. 5251. International Society for Optics and Photonics, 2004, 8 pages.

Smith, David R. et al., "Development and Testing of a 2-D Transfer CCD", IEEE Transactions on Electron Devices, vol. 53, No. 11, Nov. 2006, pp. 2748-2754.

Hang, Yu, "Time-Delay-Integration CMOS Image Sensor Design for Space Applications", School of Electrical and Electronic Engineering, a Thesis submitted to the Nanyang Technological University, 2016, 190 pages.

* cited by examiner

DEVICE FOR TIME DELAY AND INTEGRATION IMAGING AND METHOD FOR CONTROLLING TIME AND INTEGRATION IMAGING

CROSS-REFERENCE TO RELATED APPLICATIONS

The present application is a non-provisional patent application claiming priority to European Patent Application No. 18204817.3, filed Nov. 7, 2018, the contents of which are hereby incorporated by reference.

FIELD OF THE DISCLOSURE

The present disclosure relates to time delay and integration imaging. In particular, the present disclosure relates to a device for time delay and integration imaging and to a method for controlling time delay and integration imaging.

BACKGROUND

Time delay and integration (TDI) image sensing is a popular technique used for inspection of scenes with inherent linear motion such as in machine vision or earth observation. TDI image sensing may be particularly useful in light starved applications with low irradiance on the focal plane, typically a consequence of imaging faint objects and/or high speed imaging requirements, since integration of the low irradiance levels is allowed.

In TDI imaging, charges generated by light being incident on a pixel may be transferred along columns in an array of pixels of an imaging device in synchronization with a movement of the imaging device in relation to the scene. This implies that the charges may be accumulated (integrated) over time in the columns of the array so as to enable acquiring image information with a high signal-to-noise ratio.

However, in order for a signal from a part of the scene to be properly integrated by a column, the column may need to be nearly perfectly aligned with the movement of the imaging device in relation to the scene. If there is an angular misalignment between the columns and the direction of movement of the imaging device in relation to the scene, a given column will not image the same point of the scene during the integration and the TDI column will integrate the signal from different parts of the scene. The result is a reduction of the contrast of the image and appearance of blur.

This implies that the imaging device may be very accurately arranged in relation to a movement direction, such that the columns are aligned with direction of movement of the imaging device in relation to the scene. Hence, installation of the imaging device, e.g. for inspection of objects on a conveyor belt, may involve tedious work in aligning the columns of the imaging device with the movement of the conveyor belt.

US 2012/0162359 discloses an apparatus of correcting image distortion using an orthogonal transfer charge-coupled device array. A wide field of view line-scan remote sensing system includes an array of orthogonal transfer charge-coupled devices (OTCCDs) configured to record image data of an optical image of a moving object received from a lens. Further, the system includes a processor coupled to the array of OTCCDS, in which the processor is configured to scan the optical image across the array of OTCCDs; and shift pixel charges along a first axis and a second axis that substantially matches an actual image motion of the moving object while the optical image is being scanned in order to reduce an amount of image distortion across the array of OTCCDs.

Thus, the possibility of transferring charges along both a first axis and a second axis implies that the transfer of charges may be adapted to the moving object. However, set up of acquiring of a TDI image may still be simplified.

SUMMARY

Embodiments of the present disclosure enable set-up for time delay and integration imaging.

These and other embodiments of the present disclosure are at least partly met by the disclosure as defined in the independent claims. Additional embodiments are set out in the dependent claims.

According to a first aspect, there is provided a device for time delay and integration imaging, the device comprising: an array of pixels being arranged in rows and columns, the rows and columns extending in a first and second direction of the array, respectively, wherein each pixel is configured to generate an electric charge proportional to intensity of electro-magnetic radiation incident on the pixel and wherein the pixels are configured to transfer generated charges in the second direction along each column of the array for accumulating the generated charges in the pixels along each column; the rows of the array comprising at least one lateral charge shifting row, which is configured to selectively shift charges at least partly in the first direction so as to selectively shift accumulated charges in a column to an adjacent column; and a controller, which is configured to receive at least two angle correction input values, wherein each angle correction input value is based on a received intensity of electro-magnetic radiation on a measurement line comprising measurement pixels, which are configured to generate an electric charge proportional to intensity of electro-magnetic radiation incident on the measurement pixels and wherein the measurement pixels are configured to transfer generated charges along the measurement line for accumulating the generated charges in the measurement pixels along the measurement line, wherein the at least two angle correction input values are acquired by measurement lines extending in directions defining different angles in relation to the second direction, wherein the controller is configured to, based on the received at least two angle correction input values, control activation of the at least one lateral charge shifting row.

Thanks to the array of pixels comprising at least one lateral charge shifting row, the charges may be shifted in the array so as to correct for a misalignment between columns and a movement of the device in relation to the scene. The at least one lateral charge shifting row may be selectively activated based on the misalignment correction.

However, in order to correctly correct for misalignment, input on the relation between a direction of charge transfer through the array and a direction of movement of the device in relation to the scene may be implemented. Thanks to the disclosure, a controller is configured to receive at least two angle correction input values. The angle correction input values are acquired by measurement lines, which extend in directions defining different angles in relation to the direction of columns in the array. Thus, the different angles used in acquiring the angle correction input values allows determining which angle is better aligned to the direction of movement of the device for enabling correction of misalignment.

The device is particularly suitable for fine-tuning of alignment. Thus, the device may first be coarsely tuned, e.g. by fixing the device in relation to a moving scene, such as a conveyor belt, or by mechanically adjusting a position of the device for correcting a relation between the device and a direction of movement, e.g. when the device is used in satellite imaging. The device may then provide an automatic fine-tuning, which implies that the coarse tuning need not be very accurate and therefore, the installation of the device is simplified.

The at least two angle correction input values may provide input to the fine-tuning of alignment, while it is not necessary to directly determine a particular angle of transferring charges through the array that may be used. Rather, according to one embodiment, the direction of measurement lines may be configured to be dynamically controllable and the input of the at least two angle correction input values may be used for step-wise determining an alignment of the transfer of charges through the array with the direction of movement of the device in relation to the scene. Thanks to the possibility of dynamic control of the direction of the measurement lines, several sets of at least two angle correction input values may be acquired in sequence so as to determine the alignment.

The at least two angle correction input values may also be used to provide feedback to a mechanically operated coarse alignment mechanism (e.g. using a motor for moving the device). Thus, the feedback may be provided in coarse alignment and, after the coarse alignment has been performed, the device may be fixed in relation to the scene and the at least two angle correction input values may be used in fine-tuning of alignment.

The device may thus be fixed so that no mechanical adjustment of the device in relation to the scene may be possible. This implies that a relation of a specific set of pixels to the scene will not change. Thus, if the specific set of pixels is used as a measurement line, the set will always provide the same information regarding the physical relation between the set of pixels and the direction of movement of the device. According to the disclosure, the controller may change a definition of the measurement line so as to dynamically control an angle of the measurement line in relation to the direction of movement of the device in relation to the scene such that different information regarding the misalignment may be acquired. The measurement line used may be iteratively changed to be better aligned to the direction of movement of the device in relation to the scene.

The changing of the direction of the measurement line used for acquiring at least one of the angle correction input values allows the automatic fine-tuning to be performed using only a few measurement lines. Thus, the device may include dedicated measurement pixels which facilitate automatic misalignment correction in TDI imaging, while the measurement pixels may be provided in a small area on the device.

The two angle correction input values may be compared such that a determination may be made regarding which angle correction input value is acquired with a closer alignment of the measurement line to the movement direction of the device in relation to the scene. Thus, using at least two correction input values is sufficient in order to enable determining a direction for correction. However, it should be realized that more than two angle correction input values may be provided, wherein the angle correction input values are acquired by measurement lines extending in directions defining different angles in relation to the second direction. Using more than two angle correction input values, it may be possible to faster determine the misalignment correction to implement as fewer iterations of changing the measurement lines may be performed.

In fact, according to another embodiment, the device may comprise a plurality of different measurement lines, each arranged at a different angle in relation to the second direction. Then, the measurement line providing a best contrast may define the direction of movement of the device in relation to the scene so that activation of the at least one lateral charge shifting row may be controlled to align charge transfer through the array to the direction of movement of the device in relation to the scene. Thus, according to this embodiment, the device may comprise several measurement lines in order to enable determining the correct fine-tuning of the alignment, after the device has been fixed so that no mechanical adjustment of the device in relation to the scene may be possible. On the other hand, the fine-tuning may be very quickly performed, as there is no need to iterate measurements in order to determine the correct alignment.

In the context of this application, the phrase "movement of the device in relation to the scene" should be construed to encompass as any movement that causes the device and the scene to change physical relation. Thus, the movement may be caused by any combination of the device moving and/or the scene moving. The device may be fixed while the scene is moving or the scene may be fixed while the device is moving or both the device and the scene may be moving so as to change their physical relation.

It should be understood that the at least one lateral charge shifting row may in different ways control shifting of accumulated charges from a column in the array to an adjacent column. The lateral charge shifting row may transfer charges along the row, i.e. in the first direction, but may alternatively transfer charges in a direction which has a component in both the first direction and the second direction, i.e. shifting charges at least partly in the first direction. The lateral charge shifting row may thus transfer charges in a diagonal direction through the array so that the charges are transferred both to the adjacent row and the adjacent column in one charge transfer operation. It should be realized that the lateral charge shifting row may be selectively configured to shift charges to an adjacent column to the left or an adjacent column to the right. However, according to an alternative, the array may comprise a plurality of lateral charge shifting rows, wherein each charge shifting row is dedicated to shift charges either to the left or to the right when being activated. This may simplify a function and control of the lateral charge shifting rows, but may also limit flexibility of shifting of charges through the array.

The array may comprise a plurality of lateral charge shifting rows in order to enable selective activation of a number of lateral charge shifting rows within the array depending on a misalignment correction. The plurality of lateral charge shifting rows may be dedicated to shift charges either to the left or to the right or may be configured to enable selecting in which direction the charges are to be shifted.

The lateral charge shifting rows may be configured to apply a common transfer of charges to all the pixels in the row. This implies that charges will be transferred side-by-side through the columns of the array, possibly being shifted simultaneously for all the columns one or more times in a lateral direction. The implementation of lateral charge shifting is common for pixels in the row and may thus be controlled by a common control signal. Thanks to the use of measurement pixels for determining the alignment, the activation of the at least one lateral charge shifting row may then be applied in common to all the pixels in the lateral charge shifting row.

The at least two angle correction input values may each be received from different sets of measurement pixels. This implies that each set of measurement pixels may be controlled to define the measurement line with a desired angle in relation to the direction of movement of the device in relation to the scene. Thus, at least two different measurement lines may be defined for acquiring the at least two angle correction input values simultaneously. However, according to an alternative, a single set of measurement pixels may be used. Then, the at least two angle correction input values may be acquired at different times, wherein the set of measurement pixels are differently controlled at the different times in order to define two measurement lines with different angles through the set of measurement pixels. In some embodiments, the at least two angle correction input values are acquired close in time to each other, so that the determination of a misalignment is not affected by changes to the scene during acquiring of the at least two angle correction input values.

It should also be understood that the measurement lines extending in directions defining different angles in relation to the second direction implies that the measurement lines have differing directions of extension in respect to each other. However, one of the measurement lines may extend in a direction along the second direction, i.e. be parallel to the second direction.

According to an embodiment, the controller, based on the received at least two angle correction input values, is configured to determine a direction of change for aligning shifting of charges through the array with a movement of the device in relation to a scene, and to control activation or de-activation of lateral charge shifting by the at least one lateral charge shifting row based on the determined direction of change.

The at least two angle correction input values may allow determining which measurement line is better aligned to the direction of movement of the device in relation to the scene. Thus, the determined direction of change may be used for changing a direction of at least one measurement line in order to acquire new angle correction input values in relation to new angles of the measurement lines. In this way, the measurement lines may be iteratively changed to be closer aligned to the direction of movement of the device in relation to the scene until a best alignment is determined. Then, the controller may activate or de-activate the at least one lateral charge shifting rows in order to ensure that charges are transferred through the array in a direction that is closely aligned with the direction of movement of the device in relation to the scene.

According to an embodiment, the controller is configured to determine a contrast of image information based on the at least two angle correction input values for determining the direction of change.

The contrast of image information is related to acquiring of a TDI image in alignment with the direction of movement of the device in relation to the scene. With a misalignment, accumulated charges in a measurement line will not correspond to a single point in the scene, which leads to blurring of image information and lower contrast.

The accumulated charges in the at least two measurement lines indicate an intensity of light incident on the measurement pixels in the respective measurement lines. These indications of intensity of light may be used as basis for determining angle correction input values. Thus, a measurement line may acquire a sequence of image values corresponding to intensity of light incident on the measurement pixels in the measurement line. Each image value may thus be based on accumulation of charges along the measurement line for different points in the scene passing the device. If the measurement line is well aligned to the direction of movement of the device in relation to the scene, there may be a large variation in the image values and a high contrast in the sequence of image values acquired by the measurement line may be determined. On the other hand, if the measurement line is not aligned to the direction of movement of the device in relation to the scene, image information will be blurred and a low contrast in the sequence of image values acquired by the measurement line may be determined.

Thus, a contrast of image information for each measurement line may be determined. This contrast may be provided as an angle correction input value for the measurement line and may be compared to contrasts for other measurement lines. Thus, the measurement line providing higher contrast may be determined to be closer aligned to the movement of the device in relation to the scene for determining the direction of change for aligning the measurement line to the movement direction.

According to an embodiment, the device comprises at least two measurement arrays of measurement pixels for defining a measurement line in each measurement array, wherein the controller is configured to receive an angle correction input value from each measurement array.

This implies that the measurement lines may be defined in separate measurement arrays such that the at least two angle correction input values may be simultaneously acquired.

The measurement arrays may comprise lateral charge shifting rows in order to enable selective shifting of charges at least partly in the first direction within the measurement array in order to allow measurement lines to be dynamically defined within the measurement array.

According to an embodiment, the at least two measurement arrays are arranged in vicinity of the array of pixels and wherein columns of the measurement arrays are arranged to extend parallel to the columns of the array.

This implies that the at least two measurement arrays are arranged in a close relation to the array of pixels and extend in the same direction as the columns of the array such that the angle correction input values acquired by the at least two measurement arrays are relevant to the alignment of the charge transfer through the array to the movement of the device in relation to the scene. The determined direction of a measurement line through the measurement arrays providing best alignment to the movement of the device in relation to the scene may thus be used for defining a direction of the transfer of charges through the array.

According to an embodiment, the at least two measurement arrays are arranged within an area defined by the array of pixels and extend parallel to the columns of the array.

This implies that the measurement arrays may be arranged within the area defined by the array to ensure that the angle correction input values acquired by the at least two measurement arrays also apply to the alignment of the charge transfer through the array to the movement direction of the device in relation to the scene. However, arranging the measurement arrays within the area of the array may be more complex, as the lateral shifting of the charges within the measurement arrays may be individually controlled in order to ensure that the measurement lines are defined with different angles in relation to the second direction.

According to an embodiment, the rows of the array comprise a plurality of lateral charge shifting rows.

This allows selecting different angles of the accumulation of charges through the array. The distance between adjacent lateral charge shifting rows may be identical for each pair of adjacent lateral charge shifting rows, such that lateral charge shifting may be applied at regular intervals during the transfer of charges through the array. In an embodiment, each row may allow lateral charge shifting such that the array may be completely flexible in defining how many rows that should shift charges laterally and which rows should be used for lateral charge shifting.

According to an embodiment, the direction of the measurement line used for acquiring at least one of the angle correction values is dynamically controllable by the controller.

This implies that fine-tuning of an alignment of the device may be provided in iterations using different directions of the measurement line, as dynamically controlled by the controller. Hence, a small area of the device may be used for acquiring the angle correction values, as the same area may be used for acquiring different angle correction input values based on different directions of the measurement line.

According to another embodiment, the device comprises more than two measurement lines of measurement pixels, each measurement line being defined at a unique angle in relation to the columns of the array of pixels for providing angle correction input values to the controller.

Thus, the device may be provided with a plurality of measurement lines which may be statically arranged in the device for providing angle correction input values corresponding to different angles of the measurement lines in relation to the second direction. The measurement line among the plurality of measurement lines being closest aligned to the movement direction of the device in relation to the scene may thus be determined. The controller may thus be configured to control activation of the at least one lateral charge shifting row to define a direction of accumulation of charges in the array to correspond to the direction of extension of the best measurement line.

A relatively large area may be utilized in order to accommodate the plurality of measurement lines for acquiring information of the direction of movement of the device in relation to the scene. However, the fine-tuning of alignment of accumulation of charges to the direction of movement of the device in relation to the scene may be very quickly provided as the correct alignment may be determined in a single iteration using information from the plurality of measurement lines.

It may not be necessary for the device to include a large plurality of measurement lines. However, the number of measurement lines may limit an angular range of correction for which correction information may be acquired after a mechanical adjustment of the device has been fixed.

According to an embodiment, the device comprises more than two measurement arrays of measurement pixels for defining a measurement line in each measurement array, each measurement line being defined at a unique angle in relation to the columns of the array of pixels for providing angle correction input values to the controller.

Even if the device may allow for dynamic control of direction of measurement lines, the device may still use angle correction input values from more than two measurement lines. Thus, more than two measurement arrays may be used for defining the more than two measurement lines used for acquiring the angle correction input values.

This implies that a plurality of angle correction input values may be acquired simultaneously. Thus, the misalignment correction may be more quickly determined. Also, an iterative misalignment correction may be more accurately determined by using input of at least three angles of the measurement lines.

According to an embodiment, the device further comprises a read-out structure, which is connected to a row of pixels at an end of the columns in the array and which is configured to read out a signal of accumulated charges transferred through the array.

The read-out structure may thus read out a signal of accumulated charges that each correspond to integration of electro-magnetic radiation from a single point in the scene. Thus, the signal read out by the read-out structure may be used to form a TDI image.

According to an embodiment, the controller is further configured to synchronize charge shifting along a direction of the columns of the array with movement of the device in relation to a scene being imaged.

The synchronization of the charge shifting with the movement of the device in relation to the scene implies that the accumulated charges apply to the same point in the scene and that electro-magnetic radiation from the same point in the scene is integrated in the accumulated charges.

According to a second aspect, there is provided a method for controlling time delay and integration, TDI, imaging, the method comprising: acquiring at least two angle correction input values while an imaging device is moved in relation to a scene, wherein each angle correction input value is acquired by, in a measurement line comprising measurement pixels, each of the measurement pixels generating an electric charge proportional to intensity of electro-magnetic radiation incident on the measurement pixels and the measurement pixels transferring generated charges along the measurement line for accumulating the generated charges in the measurement pixels along the measurement line, wherein the at least two angle correction values are acquired by measurement lines extending in directions defining different angles in relation to a movement direction of the imaging device; determining a direction of misalignment of the measurement columns in relation to the movement direction of the imaging device; repeatedly controlling the direction of the measurement line used for acquiring at least one of the angle correction values and acquiring the at least two angle correction input values and determining the direction of misalignment; outputting a control signal for selectively activating lateral shifting of charges in the imaging device; and acquiring a TDI image using an array of pixels being arranged in rows and columns, the rows and columns extending in a first and second direction of the array, respectively, wherein each pixel is configured to generate an electric charge proportional to intensity of electro-magnetic radiation incident on the pixel and wherein the pixels are configured to transfer generated charges in the second direction along each column of the array for accumulating the generated charges in the pixels along each column and wherein the rows of the array comprise at least one lateral charge shifting row, which in accordance with the control signal selectively shifts charges at least partly in a lateral direction so as to selectively shift accumulated charges in a column to an adjacent column in the array.

Effects and features of this second aspect are largely analogous to those described above in connection with the first aspect. Embodiments mentioned in relation to the first aspect are largely compatible with the second aspect.

Thanks to the use of repeatedly acquiring at least two angle correction input values with different angles of the measurement lines, the alignment of the transfer of charges through the array to the direction of movement of the device in relation to the scene may be iteratively determined by using few dedicated measurement pixels.

According to an embodiment, the outputting comprises outputting a plurality of control signals for selectively activating lateral shifting in each of a plurality of lateral charge shifting rows.

Thus, the acquiring of a TDI image may be based on shifting of charges in a plurality of lateral charge shifting rows so as to enable tuning of the acquiring of the TDI image to multiple different angles between the second direction and the direction of movement of the device in relation to the scene.

According to an embodiment, the determining of an angular relation comprises determining a contrast of image information acquired by the at least two angle correction input values.

The determination of the contrast may allow determining which measurement line is closer to imaging a single point in the scene. Thus, the measurement line being closer aligned to the movement of the device in relation to the scene may be determined for determining the direction of change for aligning the measurement line to the movement direction.

According to an embodiment, the method further comprises, prior to acquiring at least two angle correction input values, coarsely aligning the columns of the array to the movement direction of the imaging device in relation to the scene.

This implies that e.g. an installer may first coarsely align the device to the movement direction of the device in relation to scene. The coarse alignment need not be very accurate, because any misalignment may be handled by the automatic fine-tuning by repeated determination of at least two angle correction input values. The imaging device may be fixed after the coarse alignment so as to define the relation of the imaging device to the scene. Then, the automatic fine-tuning may be used to handle misalignments in the fixed position of the imaging device.

BRIEF DESCRIPTION OF THE FIGURES

The above, as well as additional, features will be better understood through the following illustrative and non-limiting detailed description of example embodiments, with reference to the appended drawings.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Detailed embodiments of the present disclosure will now be described with reference to the drawings.

Figure 1:
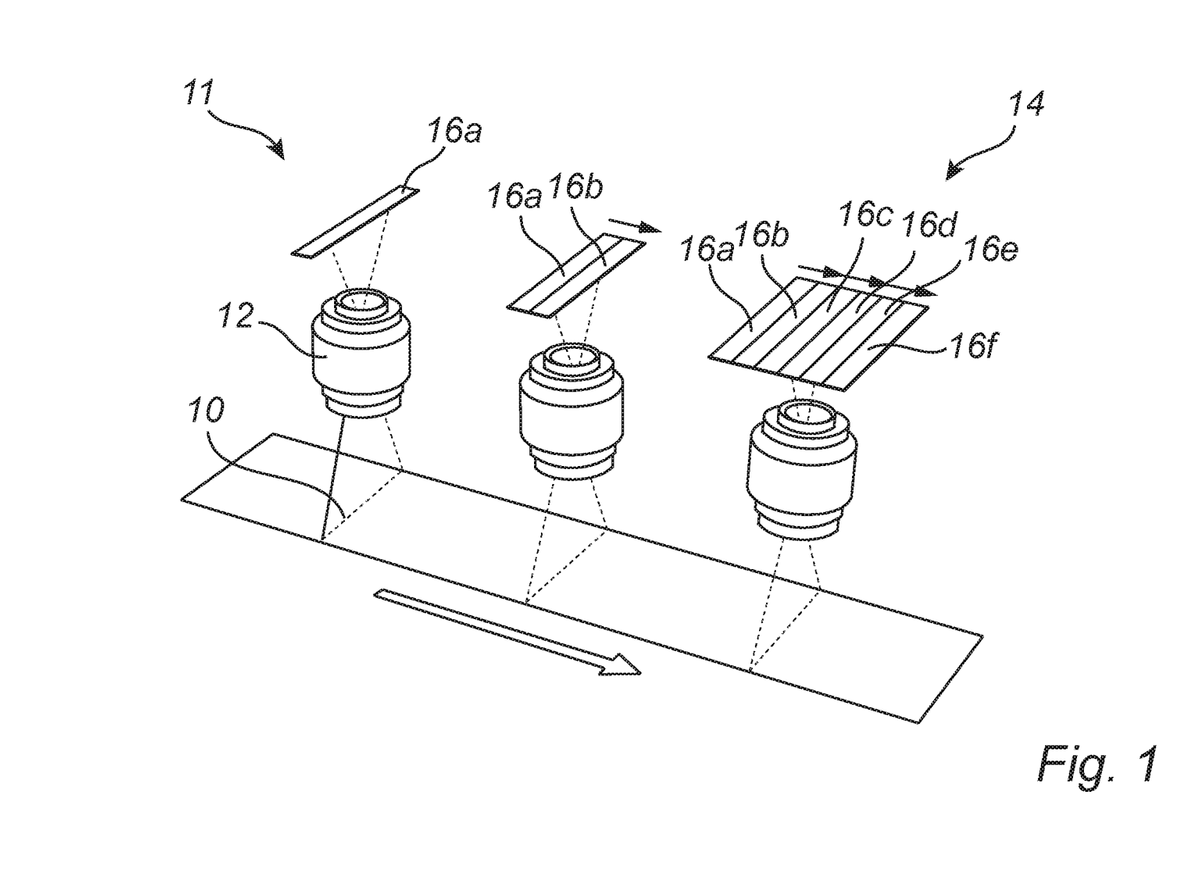
FIG. 1 is a schematic view of time delay and integration imaging, according to an example embodiment.

Referring to FIG. 1, a principle of time delay and integration (TDI) imaging will first be described. An object or scene 10 is imaged by a device 11 for TDI imaging, which may comprise an optical system 12 and an image sensor 14, where the optical system 12 forms an image of the scene 10 onto the image sensor 14. The scene 10 moves in relation to the image sensor 14, wherein the movement may be due to the scene 10 moving, the imaging device 11 or the image sensor 14 moving or both the object 10 and the image sensor 14 moving. For instance, the image sensor 14 may be arranged in an airplane in flight and ground below the airplane may be imaged onto the image sensor 14, or a stationary image sensor 14 may be arranged to image objects 10 on a moving conveyor belt.

The image sensor 14 may comprise an array of pixels 20 being arranged in rows 16 and columns 18.

During a first exposure period, a part of the scene 10 is imaged onto a first row 16a of pixels in the array. During exposure, an electric charge is accumulated in proportion to an intensity of incident light in the first row 16a of pixels. The accumulated charge is then transferred to a second row 16b of pixels. Simultaneously, the scene 10 moves in relation to the image sensor 14 such that the part of the scene 10 is now imaged onto the second row 16b of pixels in a second exposure period. The accumulated charges in the second row 16b of pixels during the second exposure period may thus be added to the accumulated charges received from the first row 16a of pixels. This procedure may be repeated while the scene 10 is imaged on a plurality of rows 16a-f of pixels such that integration of accumulated charges from a plurality of rows 16a-f of pixels occurs, providing a long exposure time for imaging of the scene 10. This principle may for instance be of interest in light-starved applications, where integration allows a signal of interest to be detectable over noise levels.

Figure 2:
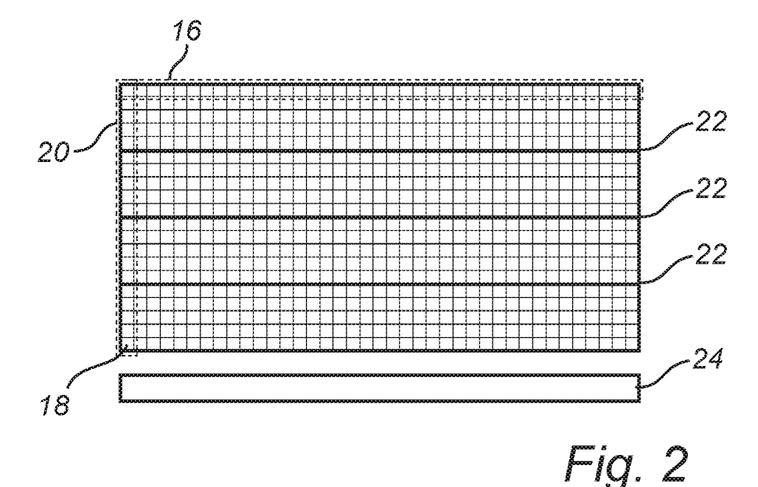
FIG. 2 is a schematic view of an imaging device for time delay and integration imaging enabling lateral charge shifting, according to an example embodiment.

Referring now to FIG. 2, an imaging array of pixels 20 will be generally described. The imaging array may define an imaging area, which is divided into pixels 20 that are arranged in columns 18 and rows 16a-f. The rows may extend along a first direction, whereas the columns extend along a second direction, which may typically be perpendicular to the first direction.

Each pixel 20 may comprise a photo-active region. The photo-active region may be arranged to create an electric charge when electro-magnetic radiation is incident on the photo-active region. The electric charge may be created in proportion to an intensity of incident electro-magnetic radiation. Thus, an electric charge may be accumulated that is proportional to the intensity of incident electro-magnetic radiation during an exposure period.

The imaging array of pixels 20 may be implemented as a charge-coupled device (CCD). The CCD pixels 20 are configured to provide shifting of charges between pixels, such that the charges accumulated in the photo-active region of one pixel 20 may be transferred to another pixel to be combined (integrated) with the charges accumulated in the other pixel, as discussed above. The shifting of charges may be synchronized with a speed of movement of the device 11 in relation to the scene 10 being imaged.

The charge transfer provided between CCD pixels 20 allows accumulation of charges without adding of noise. Thus, the charges integrated in a plurality of pixels 20 may be read out at an end of a column with a very high signal-to-noise ratio as there is a single source of read-out noise when reading out the signal at the end of the column.

The device 11 may further comprise a read-out structure 24, which may be associated with ends of columns 18 of the array. Thus, the charges at the ends of the columns 18 may be read-out by the read-out structure 24 for reading out an image value corresponding to an intensity of light being integrated to the end of the column 18.

The read-out structure 24 may be associated with one or more analog-to-digital converters (ADC) for converting the integrated charges to digital values, which may be further processed, e.g. by an image processing unit.

The charges are typically transferred along the columns, i.e. in the second direction of the array. However, as indicated in FIG. 2, the array may further comprise at least one lateral charge shifting row 22. This implies that the shifting of charges through the array of pixels 20 may be varied in dependence of whether the at least one lateral charge shifting row 22 is activated.

When the lateral charge shifting row 22 is not activated, the charges may be transferred along the columns of the array, i.e. in the second direction. However, when the lateral charge shifting row 22 is activated, the charges may be transferred to an adjacent column. The charge shifting caused by the lateral charge shifting row 22 may be in the first direction, i.e. along the row so that charges are shifted to the left or right within the row. Alternatively, the charge shifting caused by the lateral charge shifting row 22 may be diagonally through the array, such that charges are shifted from the lateral charge shifting row 22 to the adjacent row, while also being shifted to the left or right so that charges in a column are transferred to an adjacent column.

It should be realized that each column in the lateral charge shifting row may be associated with a plurality of charge transfer regions which may be selectively activated based on trigger signals on control lines for controlling a direction in which charge packets are shifted. The lateral charge shifting row may be configured to enable selecting shifting of charges in one lateral direction (i.e. left or right). The array may thus comprise at least one lateral charge shifting row 22 of a first type arranged to selectively shift charges to the left from a first column 18 to another column to the left of the first column. Further, the array may comprise at least one lateral charge shifting row 22 of a second type arranged to selectively shift charges to the right from a first column 18 to another column to the right of the first column. Thus, one or more of the lateral charge shifting rows 22 of the first type may be activated when it is desired to shift charges to the left through the array, whereas one or more of the lateral charge shifting rows 22 of the second type may be activated when it is desired to shift charges to the right through the array. Alternatively, each lateral charge shifting row 22 may be controlled to shift charges in any of three directions, i.e. to the left, to the right or along the column 18.

In order for a signal from a part of the scene 10 to be properly integrated by a column 18 in the array, the column 18 may be almost perfectly aligned with the movement of the imaging device 11 in relation to the scene 10. If there is an angular misalignment between the columns 18 and the direction of movement of the imaging device 11 in relation to the scene 10, a given column will not image the same point of the scene during the integration and the column 18 will integrate the signal from different parts of the scene 10. The result is a reduction of the contrast of the image and appearance of blur.

The use of the at least one lateral charge shifting row 22 allows the direction of integration of charges within the array to be controlled and dynamically defined. This implies that one or more of the lateral charge shifting rows 22 may be activated in order to define different directions of integration of charges within the array.

Referring now to FIGS. 3a-3d, charge transfer through the array for different activations of the lateral charge shifting rows 22 is illustrated. A general direction of scanning of the scene 10 is illustrated by arrow A. In each of FIGS. 3a-d, different directions of transfer of charges is indicated, illustrated by lines 30a-d.

Figure 3A:
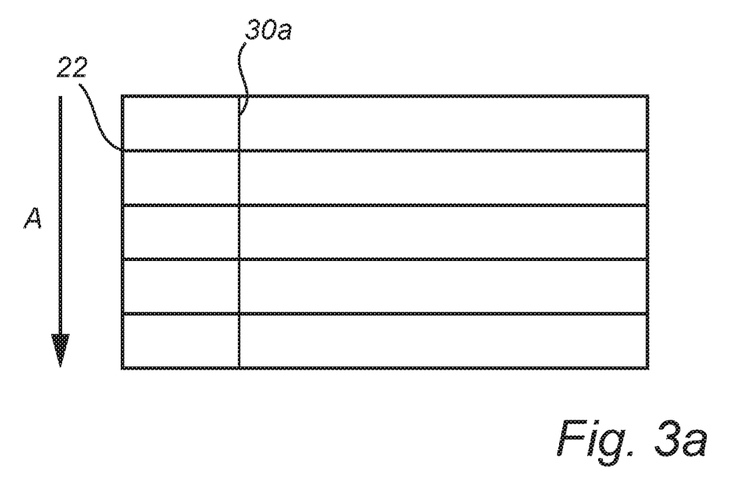
FIG. 3a is a schematic view of the imaging device of FIG. 2 with different settings for lateral charge shifting being used, according to an example embodiment.

As shown in FIG. 3a, none of the lateral charge shifting rows 22 are activated, which implies that the charges may be transferred along the columns 18 of the array, as illustrated by line 30a.

Figure 3B:
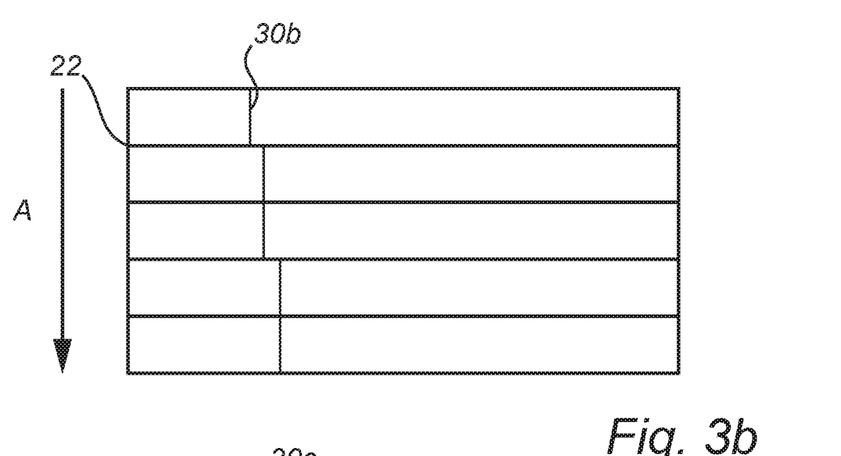
FIG. 3b is a schematic view of the imaging device of FIG. 2 with different settings for lateral charge shifting being used, according to an example embodiment.

As shown in FIG. 3b, some of the lateral charge shifting rows 22 are activated to shift charges to the left (seen in relation to the general scan direction A), which implies that the integration of charges will be slightly tilted to the left in relation to the second direction along the columns 18 of the array, as illustrated by line 30b.

Figure 3C:
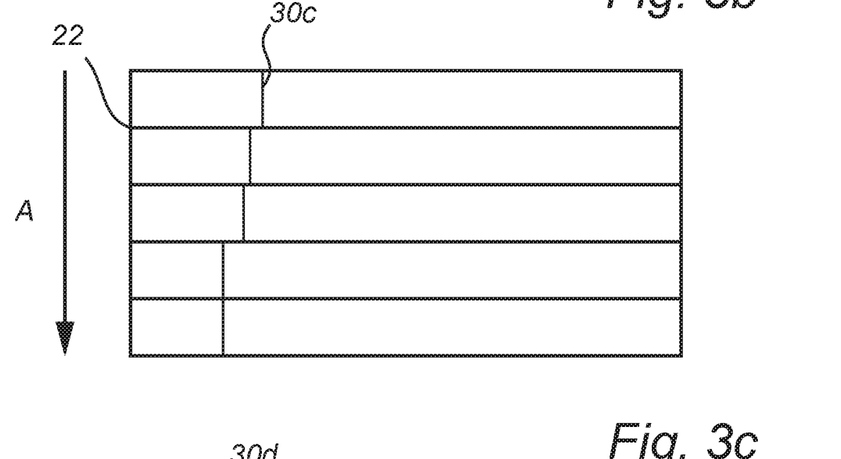
FIG. 3c is a schematic view of the imaging device of FIG. 2 with different settings for lateral charge shifting being used, according to an example embodiment.

As shown in FIG. 3c, some of the lateral charge shifting rows 22 are activated to shift charges to the right (seen in relation to the general scan direction A), which implies that the integration of charges will be slightly tilted to the right in relation to the second direction along the columns 18 of the array, as illustrated by line 30c.

Figure 3D:
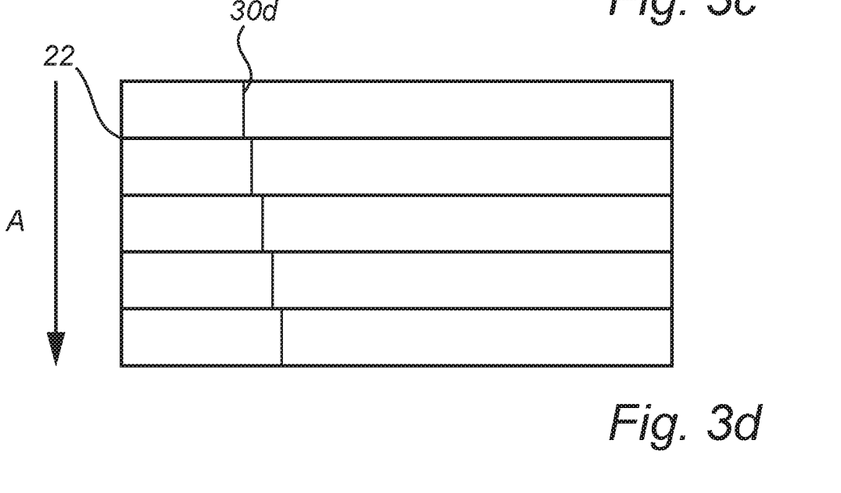
FIG. 3d is a schematic view of the imaging device of FIG. 2 with different settings for lateral charge shifting being used, according to an example embodiment.

As shown in FIG. 3d, all of the lateral charge shifting rows 22 are activated to shift charges to the left (seen in relation to the general scan direction A), which implies that the integration of charges will be substantially tilted to the left in relation to the second direction along the columns 18 of the array, as illustrated by line 30d.

The number of lateral charge shifting rows 22 to be activated may be set in order to fit the movement of the imaging device 11 in relation to the scene 10.

The imaging device 11 may be used for allowing fine-tuning of alignment of shifting of charges to the movement direction of the imaging device 11 in relation to the scene 10.

For instance, the imaging device 11 may initially be set in a fixed relation to the movement in relation to the scene 10 for providing a coarse alignment of the imaging device 11. Thus, the imaging device 11 may be fixedly arranged in relation to a conveyor belt for imaging objects traveling on the conveyor belt or the imaging device 11 may be fixedly arranged within a satellite or an airplane for earth observation.

The arrangement of the imaging device 11 may ensure that the columns 18 of the array are aligned relatively well with a direction of movement of the device 11 in relation to the scene 10. Then, the lateral charge transfer rows 22 allow a compensation of any misalignment to be provided, which implies that installation of the imaging device 11 need not be exactly perfect and which may also imply that the imaging device 11 may allow compensating for misalignments which may occur after installation, such as due to vibrations in a set-up in which the imaging device 11 is installed.

Figure 4:
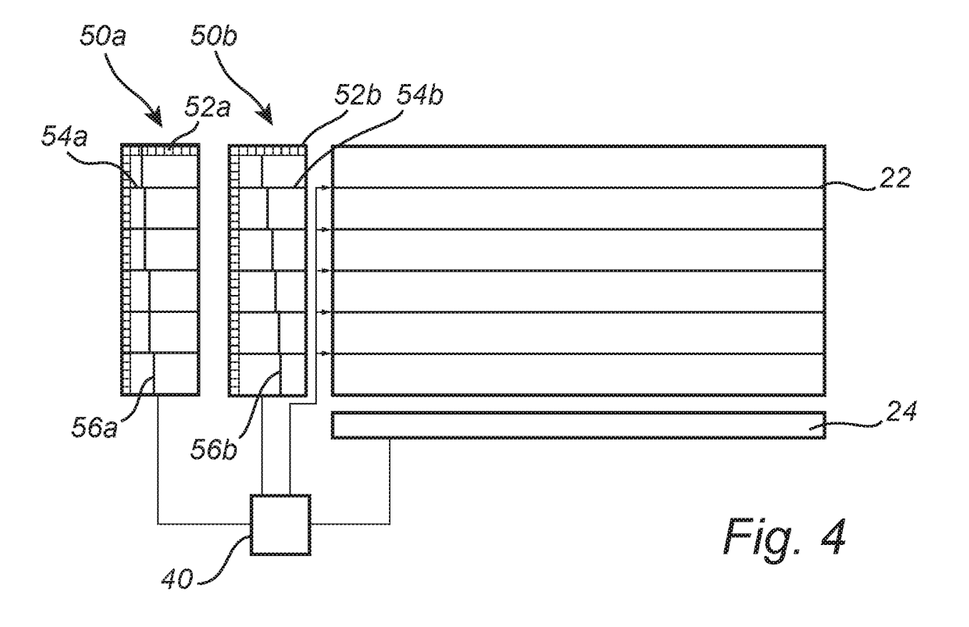
FIG. 4 is a schematic view of an imaging device, according to an embodiment.

As shown in FIG. 4, the imaging device 11 may further comprise a controller 40, which may be configured to control whether the one or more lateral charge shifting rows 22 are to be activated or not.

The controller 40 may further be configured to receive input in order to enable the controller 40 to decide whether to activate one or more of the lateral charge shifting rows 22.

Thus, the controller 40 may receive at least two angle correction input values. Each angle correction input value may be based on integrated charges proportional to intensity of electro-magnetic radiation incident on measurement pixels along a measurement line. The angle correction input values are acquired using measurement lines having different angular relation to the movement of the imaging device 11 in relation to the scene 10.

The controller 40 may thus use the angle correction input values in order to determine which measurement line is best aligned to the direction of movement of the imaging device 11 in relation to the scene 10.

According to a first embodiment, indicated in FIG. 4, the imaging device 11 may enable dynamic control of the direction of the measurement lines.

In the illustrated embodiment, the imaging device 11 comprises two measurement arrays 50a, 50b, which are used for providing the angle correction input values.

Each measurement array 50a, 50b comprises measurement pixels 52a, 52b for generating an electric charge proportional to intensity of electro-magnetic radiation incident on the measurement pixels 52a, 52b. The pixels 52a, 52b of each measurement array 50a, 50b may be arranged in rows and columns. Each measurement array 50a, 50b may further comprise a plurality of lateral charge shifting rows 54a, 54b for enabling defining different directions of transfer of charges through the measurement arrays 50a, 50b.

The measurement arrays 50a, 50b may have a small extension along the rows, i.e. only comprise a few pixels in each row, since the measurement arrays 50a, 50b are not intended for imaging the entire scene 10, but rather for acquiring an input value, which may be used for misalignment correction.

The measurement arrays 50a, 50b may comprise a number of pixels 52a, 52b per row which equals the number of lateral charge shifting rows 54a, 54b in order to enable integrating charges diagonally from a top corner of the measurement array 50a, 50b to a bottom corner of the measurement array 50a, 50b, while all the lateral charge shifting rows 54a, 54b are activated.

The measurement arrays 50a, 50b may have an equal number of rows to the number of rows of the imaging array and an equal number of lateral charge shifting rows. This implies that the direction of transfer of charges that is available within the measurement array 50a, 50b corresponds to the available directions within the imaging array.

The controller 40 may be configured to set two measurement lines 56a, 56b within the measurement arrays 50a, 50b. The measurement lines 56a, 56b are set to have different angles in relation to the direction of movement of the imaging device 11 in relation to the scene 10. Each measurement array 50a, 50b may thus provide an angle correction input value to the controller 40, which is based on different angular relation between charge transfer in the measurement array to the direction of movement of the imaging device 11 in relation to the scene 10.

The controller 40 may thus use the angle correction input values in order to determine which measurement line is best aligned to the direction of movement of the imaging device 11 in relation to the scene 10.

However, none of the measurement lines defined may still be perfectly aligned to the direction of movement of the imaging device 11 in relation to the scene.

Thus, the controller 40 may control activation of the lateral charge shifting rows 54a, 54b of the measurement arrays 50a, 50b in order to change the measurement lines 56a, 56b being defined in the arrays 50a, 50b. The measurement line 56a, 56b being less closely aligned to the direction of movement of the imaging device 11 in relation to the scene 10 may be changed to define an angle in relation to the second direction which is more similar to the angle defined by the measurement line 56a, 56b of the measurement array 50a, 50b being more closely aligned to the direction of movement of the imaging device 11 in relation to the scene 10. Further, the measurement line 56a, 56b of the other measurement array 50a, 50b may also be changed in the same direction. Thus, the measurement lines may be iteratively changed towards a close alignment to the direction of movement of the imaging device 11 in relation to the scene 10.

The measurement lines 56a, 56b of two measurement arrays 50a, 50b may be arranged to provide relatively similar angles. Thus, when it is determined that the measurement lines 56a, 56b are equally well aligned to the direction of movement of the imaging device 11 in relation to the scene 10, the angle between the direction of movement of the imaging device 11 in relation to the scene 10 and the second direction of the imaging array corresponds to an angle between the angles defined by the two measurement lines 56a, 56b.

The imaging device 11 may comprise three or more measurement arrays, which would enable quickly determining the misalignment compensation. Further, having three measurement arrays for allowing three different measurement lines having different angles to the direction of movement of the imaging device 11 in relation to the scene 10 to be simultaneously determined also allows very accurate determination of the correct angle to be used for transferring charges through the imaging array. Compared to the use of two measurement arrays 50a, 50b, wherein it can be deduced that an angle to be used should be between angles defined by two measurement lines 56a, 56b, the use of three measurement arrays may allow exactly determining the angle to be used.

The image information acquired by measurement lines may allow the controller 40 to determine a direction through the imaging array in which charges are to be transferred in order for a direction of integration of charges through the imaging array to match a direction of movement of the imaging device 11 in relation to the scene 10. The direction of transfer of charges could thus be set to correspond to a direction determined by the measurement line providing best image contrast. Hence, the controller 40 may be configured to selectively activate the one or more lateral charge shifting rows 22 such that the desired direction of charge transfer through the imaging array is achieved.

The measurement arrays 50a, 50b may be arranged in different manners in relation to the imaging array. As illustrated in FIG. 4, the measurement arrays 50a, 50b may be arranged side-by-side with the imaging array, with the columns of the measurement arrays 50a, 50b arranged to extend parallel with the columns 18 of the imaging array.

Thus, the measurement arrays 50a, 50b are arranged in the vicinity of the imaging array and are configured to detect light from a part of the scene which is very close to the part of the scene 10 imaged by the imaging array.

It should be realized that the measurement arrays 50a, 50b may alternatively be arranged before or after the imaging array as seen in the scanning direction A. This implies that the measurement arrays 50a, 50b will detect light from a part of the scene which will also be imaged by the imaging array.

The measurement arrays 50a, 50b may be arranged close to the imaging array, which implies that it may be ensured that the arrangement of the measurement arrays 50a, 50b in relation to the movement of the imaging device 11 in relation to the scene 10 is very similar to the arrangement of the imaging array. For instance, light reaching the measurement arrays 50a, 50b may pass the same optical system 12 as light reaching the imaging array. In order to avoid different angular relations of the measurement arrays 50a, 50b and the imaging array to the optical system 12 not to affect the measurements, the measurement arrays 50a, 50b may be arranged close to the imaging array.

The measurement arrays 50a, 50b may be formed as two physically separate areas of measurement pixels 52a, 52b, which may be spaced apart. Each measurement array 50a, 50b may thus be provided with individual control lines for controlling charge transfer through the respective measurement array 50a, 50b.

However, according to an alternative, the measurement arrays 50a, 50b may be provided as a single, coherent array of measurement pixels 52a, 52b, in which different angles of measurement lines 56a, 56b may be defined. Thus, each measurement array 50a, 50b may form a separate area within the coherent array. In this alternative, lateral charge shifting rows 54 may be arranged to provide individual control of columns within the array, such that different angles of the measurement lines 56a, 56b for different parts of the coherent array may be defined. Thus, dedicated parts of the single, coherent array may form the different measurement arrays 50a, 50b.

According to yet another alternative, the measurement arrays 50a, 50b may be formed within the imaging array. Thus, dedicated parts of the imaging array may be used as measurement arrays 50a, 50b for acquiring angle correction input values based on different measurement lines 56a, 56b defined within the measurement arrays 50a, 50b. Thus, at least for the columns corresponding to the measurement arrays 50a, 50b, individual control of lateral charge shifting is provided, such that different angles of the measurement lines 56a, 56b may be defined. When a misalignment compensation has been determined, the pixels 52a, 52b within the measurement arrays 50a, 50b may be used together with the rest of the pixels 20 of the imaging array for imaging the scene 10.

According to yet another alternative, the angle correction input values acquired by different measurement lines 56a, 56b need not be simultaneously acquired. In such case, a single measurement array may be used and may be controlled in a first time instance to acquire a first angle correction input value corresponding to a first angle of the measurement line 56a in relation to the direction of movement of the imaging device 11 in relation to the scene 10. Then, in a second time instance, the measurement array may be controlled to acquire a second angle correction input value corresponding to a second angle of the measurement line 56b in relation to the direction of movement of the imaging device 11 in relation to the scene 10.

The accumulated charges in the measurement lines 56a, 56b indicate an intensity of light incident on the measurement pixels 52a, 52b in the respective measurement lines 56a, 56b. These indications of intensity of light may be used as basis for determining angle correction input values. Thus, a measurement line 56a, 56b may acquire a sequence of image values corresponding to intensity of light incident on the measurement pixels 52a, 52b in the measurement line 56a, 56b. Each image value may thus be based on accumulation of charges along the measurement line 52a, 52b for different points in the scene 10 passing the imaging device 11.

If the measurement line 56a, 56b is well aligned to the direction of movement of the device 11 in relation to the scene 10, there may be a large variation in the image values and a high contrast in the sequence of image values acquired by the measurement line 56a, 56b may be determined. On the other hand, if the measurement line 56a, 56b is not aligned to the direction of movement of the device 11 in relation to the scene 10, image information will be blurred and a low contrast in the sequence of image values acquired by the measurement line 56a, 56b may be determined.

Thus, a contrast of image information for each measurement line 56a, 56b may be determined. This contrast may be provided as an angle correction input value for the measurement line 56a, 56b and may be compared to contrasts for other measurement lines 56a, 56b. Thus, the measurement line 56a, 56b providing higher contrast may be determined to be closer aligned to the movement of the device 11 in relation to the scene 10 for determining the direction of change for aligning the measurement line to the movement direction.

At least a few image values in the sequence may be acquired for each measurement line 56a, 56b. For instance, the number of image values acquired in the sequence may be in a range of 10-100 image values. It should be realized that if very few image values are acquired, then the determined contrast may be dependent on content in the scene 10 rather than on actual contrast determined. On the other hand, if many image values are used, acquiring the image values may take more time, which makes a process of misalignment compensation slower. However, it should be realized that the number of image values indicated above is merely an example and that different number of image values in the sequences may be used taking the above factors regarding few and many image values into account.

Figure 5:
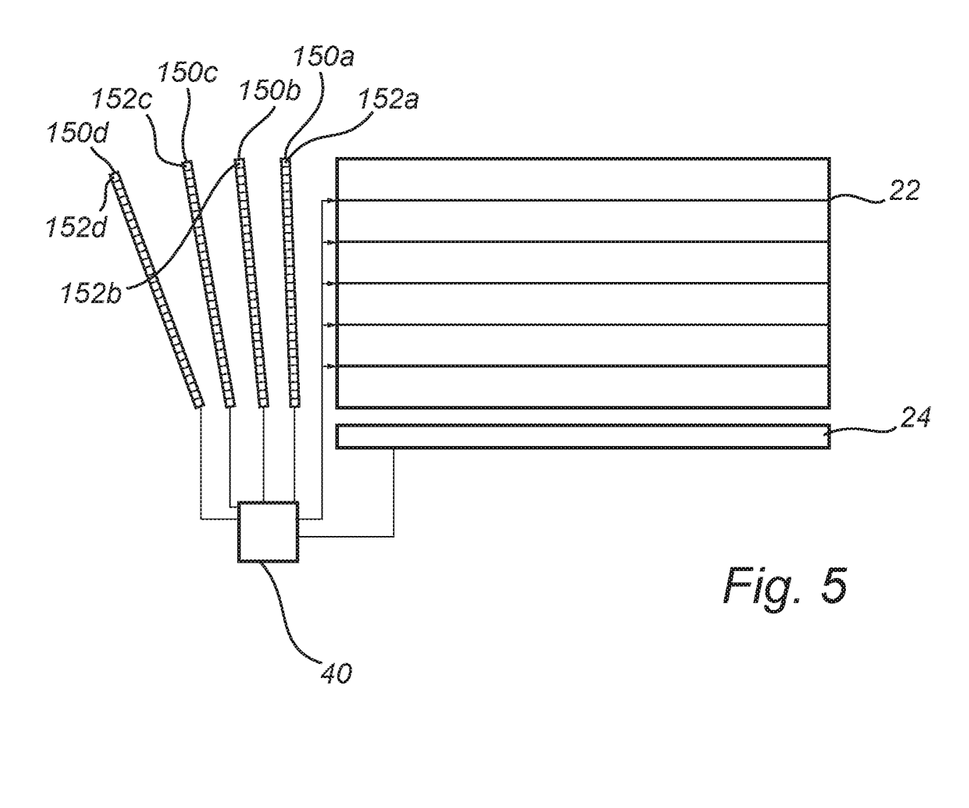
FIG. 5 is a schematic view of an imaging device, according to another embodiment.

Referring now to FIG. 5, an embodiment will be discussed, wherein a plurality of measurement lines 150a-d is provided. Each measurement line 150a-d may comprise a plurality of measurement pixels 152a-d, which are configured to generate an electric charge proportional to intensity of electro-magnetic radiation incident on the measurement pixels 152a-d and transfer charges along the measurement line 150a-d for integrating charges in the measurement line 150a-d.

The measurement lines 150a-d are arranged to extend in different directions in relation to the second direction (extension of columns 18 of the imaging array). Thus, the charges transferred in the respective measurement line 150a-d will be transferred along an angle in relation to the movement of the imaging device 11 in relation to the scene 10 defined by the extension of the measurement line 150a-d. This implies that the measurement lines 150a-d may be used for acquiring angle correction input values corresponding to different angles of the measurement lines 150a-d in relation to the second direction.

The measurement lines 150a-d may each comprise a single line of pixels for acquiring a sequence of image values, which may be used as a basis of an angle correction input value from the measurement line 150a-d. Alternatively, each measurement line 150a-d may comprise a few parallel pixels 152a-d for simultaneously acquiring image values from different parts of the scene 10, which may enable more quickly determining image contrast acquired by the respective measurement line 150a-d.

The charge transfer in each measurement line 150a-d is controlled by the arrangement of pixels 152a-d in the measurement lines 150a-d. Thus, the angle defined by the measurement line 150a-d in relation to the second direction is static on the imaging device 11.

The measurement lines 150a-d may be used for simultaneously acquiring plural angle correction input values corresponding to the different extensions of the measurement lines 150a-d. The controller 40 may determine the measurement line 150a-d providing best contrast and may use the angle of that measurement line 150a-d to selectively activate lateral charge shifting rows 22 in the imaging array to define the angle of charge transfer through the imaging array.

The use of plural measurement lines 150a-d according to this embodiment may allow very quickly determining misalignment compensation. On the other hand, it is only possible to determine a best alignment among the predefined angles of the static arrangement of the measurement lines 150a-d. The measurement lines 150a-d may be used for fine-tuning an alignment of the imaging device 11 after the imaging device 11 has been mechanically fixed. The number of measurement lines 150a-d available may set requirements on accuracy of the alignment of the imaging device 11 when the imaging device 11 is installed for imaging a scene 10.

Although four measurement lines 150a-d are shown in FIG. 5, it should be realized that a larger number of measurement lines 150a-d may be used to allow for a more flexible initial alignment of the imaging device 11 to the scene 10. For instance, the imaging device 11 may comprise ten measurement lines 150.

The lateral charge shifting rows 22 allow tuning a transfer of charges through the imaging array to the direction of movement of the imaging device 11 in relation to the scene 10. Further, the use of measurement lines 56, 150, which may be statically arranged in the imaging device 11 or may be dynamically controlled may be used for determining a misalignment compensation after installation of the imaging device 11 or during use of the imaging device 11 for compensating changes in relation between the imaging device 11 and the scene 10 (e.g. due to vibrations).

Thus, the controller 40 may determine the angle of charge transfer through the imaging array to be used for aligning charge transfer to the direction of movement of the imaging device 11 in relation to the scene 10. As described above, the controller 40 may determine the angle of charge transfer based on acquiring information from a plurality of measurement lines 150a-d and choosing an angle corresponding to the measurement line 150a-d providing a best contrast. As an alternative, the controller 40 may determine the angle of charge transfer based on iteratively acquiring information from measurement lines 56a, 56b, wherein the controller 40 dynamically changes the angle of the measurement lines 56a, 56b to iteratively find determine the desired angle of charge transfer.

The controller 40 may be configured to process the input from the measurement lines 56, 150 and may further be configured to control function of the measurement arrays 50 and the imaging array in order to control acquiring of TDI images. The controller 40 may thus be configured to process the received information and to take decisions based on the processed information.

The controller 40 may further be configured to output control signals for controlling the acquiring of angle correction input values based on different definitions of measurement lines. The controller 40 may thus be configured to output control signals for controlling activation of lateral charge shifting rows 54a, 54b of the measurement arrays 50a, 50b for defining the measurement lines 56a, 56b. The controller 40 may also be configured to output control signals for controlling timing of charge transfer between measurement pixels 52, 152 of the measurement lines 56, 150 so as to synchronize charge transfer with a speed of movement of the imaging device 11 in relation to the scene 10.

The controller 40 may further be configured to output control signals for controlling the acquiring of TDI images on the imaging array. In this regard, the controller 40 may be configured to output control signals for controlling activation of lateral charge shifting rows 22 of the imaging array. The controller 40 may also be configured to output control signals for controlling timing of charge transfer between pixels 20 of the imaging array so as to synchronize charge transfer with a speed of movement of the imaging device 11 in relation to the scene 10.

The controller 40 may be implemented as or in a central processing unit (CPU). The controller 40 may thus be a general-purpose processing unit, which may be loaded with a computer program product in order to allow the processing unit to perform the desired operations to provide the functionality of the controller 40. The controller 40 may alternatively be implemented as a special-purpose circuitry for providing only specific logical operations. Thus, the controller 40 may be provided in the form of an application-specific integrated circuit (ASIC), an application-specific instruction-set processor (ASIP), a field-programmable gate array (FPGA) or a digital signal processor (DSP).

Figure 6:
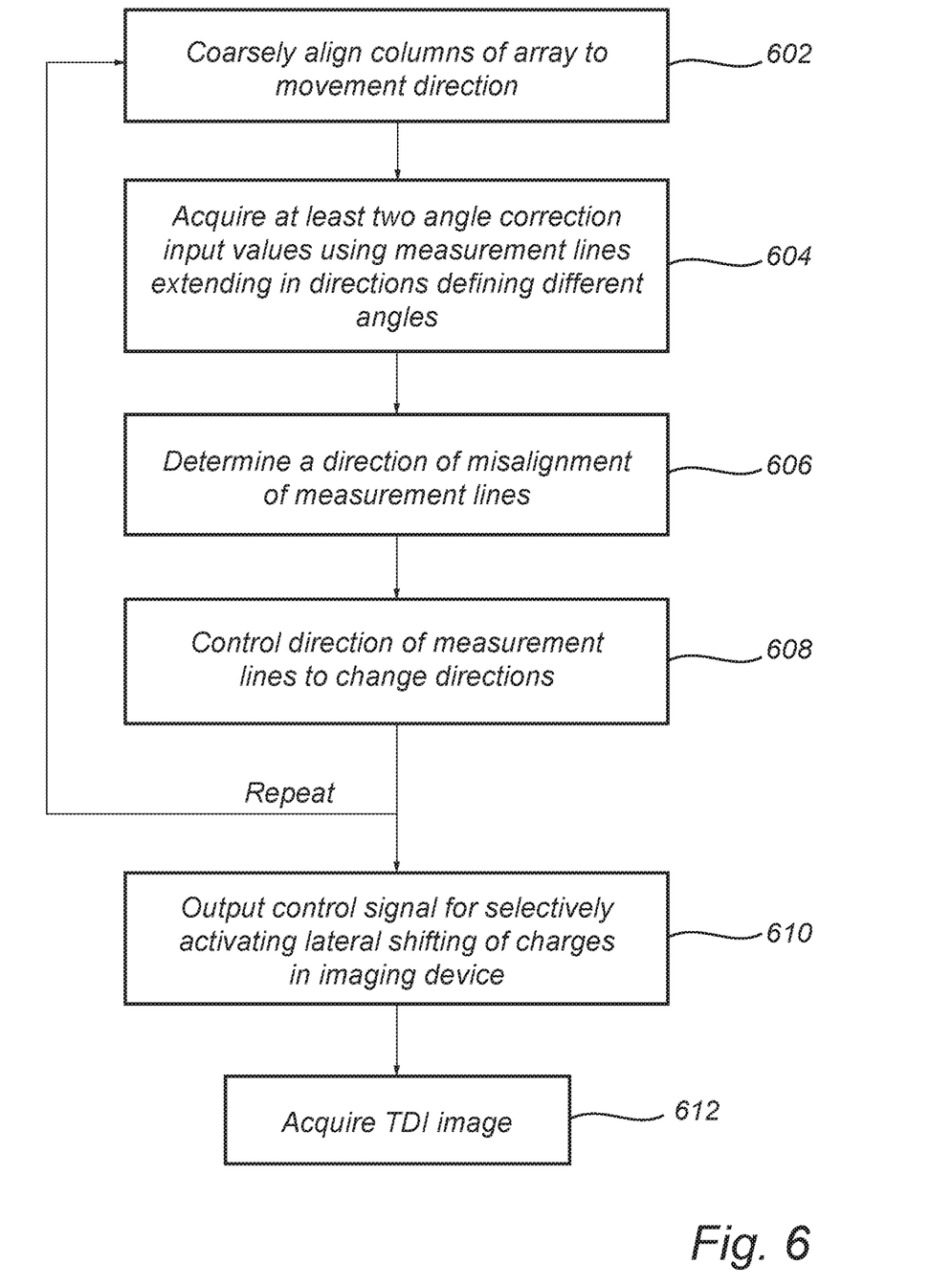
FIG. 6 is a flow chart of a method for controlling time delay and integration imaging, according to an embodiment.

Referring now to FIG. 6, a method for controlling TDI imaging will be described.

The method may include installing an imaging device 11 in a position for imaging a scene 10, wherein the imaging device 11 is configured to move in relation to the scene 10 such that integrated image information may be acquired as a point of the scene 10 moves over an imaging array of the imaging device 11.

The installing of the imaging device 11 may coarsely align, step 602, the columns 18 of the array to the movement direction of the imaging device 11 in relation to the scene 10. Then, the imaging device 11 may allow for lateral charge transfer within the imaging array in order to compensate for a misalignment between the columns 18 of the array and the movement direction of the imaging device 11 in relation to the scene 10.

The method may further comprise acquiring, step 604, at least two angle correction input values while the imaging device 11 is moved in relation to the scene 10, using measurement lines 56, 150 extending in directions defining different angles in relation to a movement direction of the imaging device 11 in relation to the scene 10.

If a plurality of measurement lines 150a-d are provided in the imaging device 11, the method may comprise determining the measurement line 150a-d being closest aligned to the direction of movement of the imaging device 11 in relation to the scene 10 and, then outputting a control signal for selectively activating lateral shifting of charges in the imaging array of the imaging device so as to ensure that charges are integrated along a direction through the imaging array corresponding to an extension of the measurement line 150a-d being closest aligned to the direction of movement of the imaging device 11 in relation to the scene 10.

Alternatively, if the imaging device 11 enables dynamic control of measurement lines 56a, 56b, the method may comprise determining, step 606, a direction of misalignment of the measurement lines 56a, 56b in relation to the movement direction of the imaging device. The direction of misalignment may indicate which measurement line 56a, 56b is closer aligned to the movement direction of the imaging device 11 in relation to the scene 10, such that a direction in which the misalignment correction to be performed is determined.

The method may further comprise controlling, step 608, the direction of the measurement line 56a, 56b used for acquiring at least one of the angle correction values. Thus, the angles of the measurement lines 56a, 56b are changed in the same direction, with the angle of the measurement line 56a, 56b being less closely aligned to the movement direction of the imaging device 11 in relation to the scene 10 being changed towards the angle of the other measurement line 56a, 56b being more closely aligned.

The method then comprises repeatedly acquiring, step 604, the at least two angle correction input values, determining, step 606, the direction of misalignment, and controlling, step 608, the direction of the measurement lines 56a, 56b. Eventually, the method may determine a direction of the measurement lines 56a, 56, which corresponds to a direction of movement of the imaging device 11 in relation to the scene 10.

The method may further comprise outputting, step 610, a control signal for selectively activating lateral shifting of charges in the imaging device in the imaging array of the imaging device so as to ensure that charges are integrated along a direction through the imaging array corresponding to an extension of the measurement line 56a, 56b being closest aligned to the direction of movement of the imaging device 11 in relation to the scene 10.

Finally, the method may comprise acquiring, step 612, a TDI image using the imaging array wherein the lateral charge shifting rows 22 in accordance with the control signals selectively shift charges at least partly in a lateral direction so as to selectively shift accumulated charges in a column 18 to an adjacent column 18 in the array and to ensure that charges are integrated along a direction within the imaging array corresponding to the direction of movement of the imaging device 11 in relation to the scene 10.

In the above the disclosure has mainly been described with reference to a limited number of examples. However, as is readily appreciated by a person skilled in the art, other examples than the ones disclosed above are equally possible within the scope of the disclosure, as defined by the appended claims.

It should for instance be understood that the imaging array may comprise any number of lateral charge shifting rows 22. Each lateral charge shifting row 22 may enable adjusting the direction of integration of charges through the imaging array. Thus, if a large number of lateral charge shifting rows 22 are provided, a high flexibility in defining the integration direction is provided. In one embodiment, each row in the imaging array may enable lateral charge shifting.

On the other hand, each lateral charge shifting row 22 may add complexity to the imaging device 11 and to reduce complexity, a number of charge shifting rows 22 may be adapted to a range of angles which it is desired to allow misalignment correction.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A device for time delay and integration imaging, the device comprising:
   an array of pixels arranged in rows and columns, the rows and columns extending in a first and second direction of the array, respectively, wherein each pixel is configured to generate an electric charge proportional to intensity of electro-magnetic radiation incident on the pixel and wherein the pixels are configured to transfer generated charges in the second direction along each column of the array for accumulating the generated charges in the pixels along each column;
   the rows of the array comprising at least one lateral charge shifting row, which is configured to selectively shift charges at least partly in the first direction so as to selectively shift accumulated charges in a particular column to an adjacent column; and
   a controller, which is configured to:
      receive at least two angle correction input values, wherein each angle correction input value is based on a received intensity of electro-magnetic radiation on a measurement line comprising measurement pixels, which are configured to generate an electric charge proportional to intensity of electro-magnetic radiation incident on the measurement pixels and wherein the measurement pixels are configured to transfer generated charges along the measurement line for accumulating the generated charges in the measurement pixels along the measurement line, wherein the at least two angle correction input values are acquired by measurement lines extending in directions defining different angles in relation to the second direction,
      based on the at least two angle correction input values, control activation of the at least one lateral charge shifting row, and
      determine a direction of change for aligning shifting of charges through the array with a movement of the device in relation to a scene, and to control activation or de-activation of lateral charge shifting by the at least one lateral charge shifting row based on the determined direction of change.

2. The device according to claim 1, wherein the controller is configured to determine a contrast of image information based on the at least two angle correction input values for determining the direction of change.

3. The device according to claim 1, wherein the device comprises at least two measurement arrays of measurement pixels configured to define a measurement line in each measurement array, wherein the controller is configured to receive the angle correction input value from each measurement array.

4. The device according to claim 3, wherein the at least two measurement arrays are arranged in vicinity of the array of pixels and wherein columns of the measurement arrays are arranged to extend parallel to the columns of the array.

5. The device according to claim 3, wherein the at least two measurement arrays are arranged within an area defined by the array of pixels and wherein columns of the measurement arrays are arranged to extend parallel to the columns of the array.

6. The device according to claim 1, wherein the rows of the array comprise a plurality of lateral charge shifting rows.

7. The device according to claim 1, wherein the direction of the measurement line used for acquiring at least one of the angle correction values is dynamically controllable by the controller.

8. The device according to claim 1, wherein the device comprises more than two measurement lines of measurement pixels, each measurement line being defined at a unique angle in relation to the columns of the array of pixels for providing angle correction input values to the controller.

9. The device according to claim 1, wherein the device further comprises a read-out structure, which is connected to a row of pixels at an end of the columns in the array and which is configured to read out a signal of accumulated charges transferred through the array.

10. The device according to claim 1, wherein the controller is further configured to synchronize charge shifting along a direction of the columns of the array with movement of the device in relation to a scene being imaged.

11. A method for controlling time delay and integration (TDI) imaging, the method comprising:
acquiring at least two angle correction input values while an imaging device is moved in relation to a scene, wherein each angle correction input value is acquired by, in a measurement line comprising measurement pixels, each of the measurement pixels generating an electric charge proportional to intensity of electro-magnetic radiation incident on the measurement pixels and the measurement pixels transferring generated charges along the measurement line for accumulating the generated charges in the measurement pixels along the measurement line, wherein the at least two angle correction values are acquired by measurement lines extending in directions defining different angles in relation to a movement direction of the imaging device;
determining a direction of misalignment of the measurement lines in relation to the movement direction of the imaging device;
repeatedly controlling the direction of the measurement line used for acquiring at least one of the angle correction values and acquiring the at least two angle correction input values and determining the direction of misalignment;
outputting a control signal for selectively activating and de-activating lateral shifting of charges in the imaging device based on the determined direction of misalignment; and
acquiring a TDI image using an array of pixels being arranged in rows and columns, the rows and columns extending in a first and second direction of the array, respectively, wherein each pixel is configured to generate an electric charge proportional to intensity of electro-magnetic radiation incident on the pixel and wherein the pixels are configured to transfer generated charges in the second direction along each column of the array for accumulating the generated charges in the pixels along each column and wherein the rows of the array comprise at least one lateral charge shifting row, which in accordance with the control signal selectively shifts charges at least partly in a lateral direction so as to selectively shift accumulated charges in a particular column to an adjacent column in the array.

12. The method according to claim 11, wherein outputting the control signal for selectively activating lateral shifting of charges in the imaging device comprises outputting a plurality of control signals for selectively activating lateral shifting in each of a plurality of lateral charge shifting rows.

13. The method according to claim 11, wherein determining a direction of misalignment of the measurement lines in relation to the movement direction of the imaging device comprises determining a contrast of image information acquired by the at least two angle correction input values.

14. The method according to claim 11, further comprising, prior to acquiring a TDI image using an array of pixels being arranged in rows and columns, the method further comprises coarsely aligning the columns of the array to the movement direction of the imaging device in relation to the scene.

* * * * *